US010488982B2

(12) United States Patent
Gur et al.

(10) Patent No.: US 10,488,982 B2
(45) Date of Patent: Nov. 26, 2019

(54) STYLUS WITH A DYNAMIC TRANSMISSION PROTOCOL

(71) Applicant: Microsoft Technology Licensing, LLC, Redmond, WA (US)

(72) Inventors: Arie Gur, Kiryat-Ono (IL); Ilan Geller, Pardesia (IL); Amir Zyskind, Natania (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 14/963,300

(22) Filed: Dec. 9, 2015

(65) Prior Publication Data
US 2016/0162118 A1   Jun. 9, 2016

Related U.S. Application Data

(60) Provisional application No. 62/089,283, filed on Dec. 9, 2014.

(51) Int. Cl.
*G06F 3/041* (2006.01)
*G06F 3/0354* (2013.01)
*G06F 3/038* (2013.01)
*G06F 3/044* (2006.01)

(52) U.S. Cl.
CPC ............ *G06F 3/0418* (2013.01); *G06F 3/038* (2013.01); *G06F 3/03545* (2013.01); *G06F 3/044* (2013.01)

(58) Field of Classification Search
CPC .... G06F 3/0418; G06F 3/03545; G06F 3/038; G06F 3/044; G01F 1/133305; G01F 1/13338
See application file for complete search history.

(56) References Cited

U.S. PATENT DOCUMENTS

| 6,734,843 | B2 | 5/2004 | Bertram et al. |
| 7,876,311 | B2 | 1/2011 | Krah et al. |
| 8,648,830 | B2 | 2/2014 | Perski et al. |
| 2,717,124 | A1 | 4/2014 | Singh et al. |
| 9,013,429 | B1 | 4/2015 | Krekhovetskyy et al. |
| 9,036,650 | B2 | 5/2015 | Wilson et al. |
| 9,086,745 | B2 | 7/2015 | Sundara-Rajan |

(Continued)

FOREIGN PATENT DOCUMENTS

| CN | 101714037 A | 5/2010 |
| CN | 202815746 U | 3/2013 |

(Continued)

OTHER PUBLICATIONS

"First Office Action & Search Report Issued in Chinese Patent Application No. 201580067124.4", dated Apr. 28, 2019, 14 Pages.

(Continued)

*Primary Examiner* — Ricardo Osorio

(57) ABSTRACT

A system includes a display integrated with a digitizer sensor, a handheld device configured to transmit a signal to the digitizer sensor based on a defined protocol, a power supply and a controller. The controller is configured to sample output from the digitizer sensor, detect parameters characterizing noise from at least one of the display and the power supply, characterize a noise environment on the digitizer sensor based on the parameters detected and provide instructions to alter a transmission protocol of the handheld device based on the noise environment.

20 Claims, 5 Drawing Sheets

(56) References Cited

U.S. PATENT DOCUMENTS

| | | | |
|---|---|---|---|
| 9,158,393 B2 | 10/2015 | Vlasov | |
| 2008/0158171 A1* | 7/2008 | Wong | G02F 1/13338 345/173 |
| 2008/0309627 A1 | 12/2008 | Hotelling et al. | |
| 2014/0078101 A1* | 3/2014 | Katsurahira | G06F 3/044 345/174 |
| 2014/0098033 A1 | 4/2014 | Simmons | |
| 2014/0240298 A1 | 8/2014 | Stern | |
| 2014/0267184 A1 | 9/2014 | Bathiche et al. | |
| 2014/0340351 A1 | 11/2014 | Forlines | |
| 2015/0062020 A1 | 3/2015 | Pourbigharaz et al. | |
| 2015/0128031 A1* | 5/2015 | Lee | G06F 3/0488 715/238 |
| 2015/0177868 A1 | 6/2015 | Morein et al. | |
| 2015/0248189 A1 | 9/2015 | Routley et al. | |
| 2016/0162051 A1* | 6/2016 | Peretz | G06F 3/03545 345/179 |
| 2017/0262100 A1* | 9/2017 | Leigh | G06F 3/042 |
| 2018/0061005 A1* | 3/2018 | Costa | G06F 3/03545 |

FOREIGN PATENT DOCUMENTS

| | | |
|---|---|---|
| CN | 103534670 A | 1/2014 |
| EP | 2172834 | 4/2010 |
| WO | 2008157249 A1 | 12/2008 |
| WO | WO 2016/092489 | 6/2016 |

OTHER PUBLICATIONS

Blankenship et al. "Projected-Capacitive Touch Systems From the Controller Point of View", Maxim Integrated Products, p. 1-7, Jun. 10, 2011.

Rodriguez "Microsoft Addresses N-Trig Concerns in Reddit Response", Surface Pro Artist, p. 1-33, May 27, 2014.

Smith "N-Trig DuoSense Pen 2 Beats iPad Note Taking Experience", Gottabemobile, p. 1-8, Mar. 8, 2013.

Synaptics "Synaptics ClearPad™ Family", Synaptics Incorporation, 3 P., Apr. 3, 2014.

Wacom "EMR® (Electro-Magnetic Resonance) Technology. The De Facto Standard for Pen Tablet Devices Is Realized Using EMR® Technology", Wacom Components, 4 P., Nov. 10, 2006.

International Search Report and the Written Opinion dated Mar. 24, 2016 From the International Searching Authority Re. Application No. PCT/IB2015/059480.

International Preliminary Report on Patentability dated Nov. 28, 2016 From the International Preliminary Examining Authority Re. Application No. PCT/IB2015/059480. (7 Pages).

\* cited by examiner

STYLUS WITH A DYNAMIC TRANSMISSION PROTOCOL

RELATED APPLICATION

This application claims the benefit of priority under 35 USC § 119(e) of U.S. Provisional Patent Application No. 62/089,283 filed on Dec. 9, 2014, the contents of which are incorporated herein by reference in their entirety.

BACKGROUND

Signal emitting styluses, e.g. active styluses are known in the art for use with a digitizer system. Position detection of the stylus provides input to a computing device associated with the digitizer system and is interpreted as user commands. Often, the digitizer system is integrated with a display screen, e.g. to form a touch screen. Position of the stylus over the screen is correlated with virtual information portrayed on the screen.

Digitizer systems that track signals emitted by the stylus also typically track input provided with a finger or conductive object. A mutual capacitive sensor is one type of digitizer sensor for such digitizer systems. Mutual capacitive sensors typically include a matrix formed with parallel conductive material arranged in rows and columns with a capacitive connection created around overlap and/or junction areas formed between rows and columns. Bringing a finger or conductive object close to the surface of the digitizer sensor changes the local electrostatic field and reduces the mutual capacitance between junction areas in the vicinity. The capacitance change at junctions is determined by applying a signal along one axis of the matrix while sampling output on the other axis to detect a coupled signal. Mutual capacitive detection allows multi-touch operation where multiple fingers, palms or conductive objects can be tracked at the same time. Stylus input may be tracked by sampling output along both axes of the sensor to identify locations on the matrix at which the stylus signal is picked-up.

SUMMARY

The disclosure in some embodiments relates to a system and method for a touch enabled computing device to dynamically assess a noise environment related to stylus interaction and to suggest updates to the transmission protocol of the stylus based on the assessment. The system and method may be applied to dynamically assess a noise environment related other handheld devices that transmit information to an enabled computing device and to suggest updates to the transmission protocol of the handheld based on the assessment. A computing device takes measurements and gathers reports on-the-fly while a user is interacting with the computing device and uses the information to dynamically suggest improved transmission protocols for transmitting a signal to the digitizer sensor. The information includes noise detected from output sampled from the digitizer sensor and reports related to current activity of a power supply and electronic display of the computing devices. In some exemplary embodiments, updating of the transmission protocol is initiated responsive to detecting jitter in the tracked stylus tip position.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
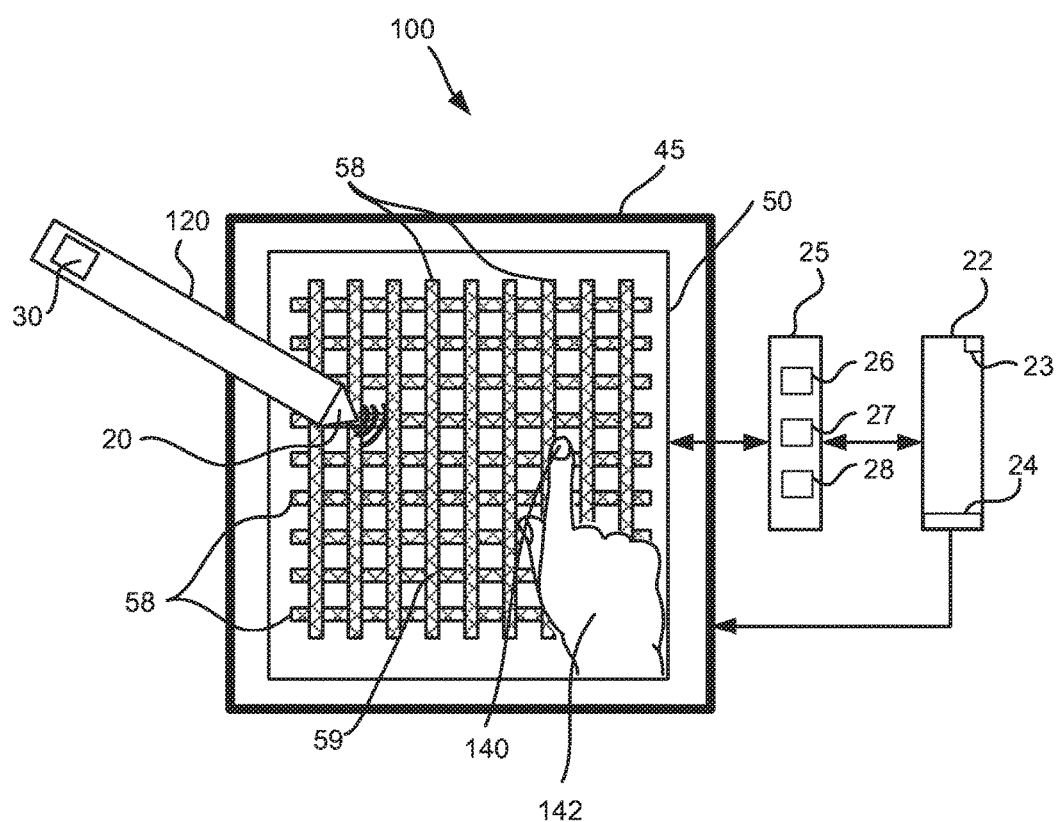
FIG. 1 is a simplified block diagram of an exemplary stylus enabled computing device in accordance with some embodiments of the present disclosure.

In exemplary embodiments of the present disclosure, a transmission protocol of stylus interacting with a computing device is dynamically updated based on activity of the computing device's power supply, activity of the computing device's display and additional noise detected as detected for example from sampled output of the computing device's digitizer sensor. The noise environment surrounding a stylus is particularly dynamic. Both the frequency of the noise as well as its occurrence in particular times in the refresh cycle of the computing device changes based on the type of image that is being displayed, the rate that the image content changes, charging activity of the power supply, and grounding state of the power supply. Parameters defining a current activity of the computing device's display and power supply may be obtained based on reports provided by the computing device and based on output sampled from the digitizer sensor.

For example, a liquid crystal display (LCD) typically imposes strong impulse noises on the digitizer sensor at harmonics of its vertical synchronization (Vsync) and its horizontal synchronization (Hsync). Noise also appears during sub-pixel refresh periods and depends on the colors being displayed. In some exemplary embodiments, input from the graphical processing unit (GPU) is obtained to determine timing and characteristics of these occurrences. Optionally, output from the digitizer sensor is also used to detect noise patterns from the LCD.

Much of the energy associated with a power supply may typically be between 50 KHz-300 KHz and can change very quickly within this range depending on its current activity. In some exemplary embodiments, a computer processing unit (CPU) of the computing devices provides on-the-fly information regarding activity of the power supply that affects its working frequency. Optionally, repetitive behavior of the power supply is learned based on parameters reported from the CPU and based on accumulated output sampled from the digitizer sensor. Noises from the power supply are typically imposed on the digitizer sensor due to ground mismatch between the computing device and the user. Movement of the user's hand on the digitizer sensor also changes the noise amplitude and the frequency response.

Sampled output from a digitizer sensor is periodically analyzed for noise. In some exemplary embodiments, noise originating from each of the power supply, the electronic display as well as other sources is identified from the sampled output. Typically, power supply noise is identified in output from areas on the digitizer sensor that include finger or hand touch interaction and noise due to the electronic display may be detected from areas of the digitizer sensor with no user interaction.

In exemplary embodiments of the present disclosure, a digitizer sensor controller or the computing device communicates with the stylus to request an updated transmission protocol based on a current noise environment. Updates in the transmission protocol may include defining frequencies for transmission, periods to transmit, symbol size, symbol timing, symbol modulation, baud rate and coding. Optionally, updating is in response to identifying jittering in the tracked position of the stylus tip.

Reference is now made to FIG. 1 showing a simplified block diagram of an exemplary stylus enabled computing device in accordance with some embodiments of the present disclosure. According to some embodiments of the present disclosure, a computing device 100 includes a display 45 that is integrated with a digitizer sensor 50. In some exemplary embodiments, digitizer sensor 50 is a grid based capacitive sensor formed with row and column conductive strips 58 forming grid lines of the grid based sensor. Typically, conductive strips 58 are electrically insulated from one another and each of conductive strips is connected at least at on one end to digitizer circuitry 25. Typically, conductive strips 58 are arranged to enhance capacitive coupling between row and column conductive strips, e.g. around junctions 59 formed between rows and columns. The capacitive coupling formed between the row and column conductive strips is sensitive to presence of conductive and dielectric objects.

According to some embodiments of the present disclosure, conductive strips 58 are operative to detect touch of one or more fingertips 140 or hand 142 or other conductive objects as well as input by stylus 120 transmitting an electromagnetic signal typically via the writing tip of the stylus. Digitizer circuitry 25 applies mutual capacitance detection or a self-capacitance for sensing a touch signal from touch (or hover) of fingertip 140. Typically, during mutual capacitance and self-capacitance detection, digitizer circuitry 25 sends a triggering signal, e.g. pulse to one or more conductive strips 58 of digitizer sensor 50 and samples output from conductive strips 58 in response to the triggering and/or interrogation. In some embodiments, some or all of conductive strips 58 along one axis of the grid based sensor are triggered simultaneously or in a consecutive manner, and in response to each triggering, outputs from conductive strips 58 on the other axis are sampled. Typically, this procedure provides for detecting coordinates of multiple fingertips 140 touching sensor 50 at the same time (multi-touch).

Digitizer circuitry 25 typically includes finger detection engine 26 for managing the triggering signal, for processing the touch signal and for tracking coordinates of one or more fingertips 140. Digitizer circuitry 25 also typically includes stylus detection engine 27 for synchronizing with stylus 120, for processing input received by stylus 120 and/or for tracking coordinates of stylus 120. Typically, output from both row and column conductive strips 58 are sampled to detect coordinates of stylus 120. Input received by stylus 120 may include information such as stylus identity and pressure applied on tip 20 of stylus 120. Typically, stylus detection engine 27 decodes information received from stylus 120.

According to exemplary embodiments, digitizer circuitry 25 includes a noise detection engine 28 that dynamically detects characteristics of the noise from output sampled on the sensor. In some exemplary embodiments, noise detection engine 28 receives input from finger detection engine 26 and noise associated with a power source 24 powering computing device 100 is characterized using input from finger detection engine 26, e.g. based on input detected at location of finger input. Optionally, noise associated with the electronic display is characterized based on input from conductive strips 58 with no user interaction. Optionally, noise detection engine 253 periodically reports output sampled from digitizer sensor to host 22 for characterizing a current noise environment on digitizer sensor 50.

Typically, output from digitizer circuitry 25 is reported to host 22. Typically, the output provided by digitizer circuitry 25 may include coordinates of one or more fingertips 140, coordinates of writing tip 20 of stylus 120 and output from noise detection engine 28 for characterizing the noise. Typically, digitizer circuitry 25 uses both analog and digital processing to process signals detected with digitizer sensor 50. Optionally, some and/or all of the functionalities of engines 26, 27 and 28 are integrated in one or more processing units adapted for controlling operation of digitizer sensor 50. Optionally, some and/or all of the functionalities of digitizer circuitry 25, engines 26, 27 and 28 are integrated and/or included in host 22.

According to some exemplary embodiments, stylus 120 additionally includes a wireless communication unit 30 for receiving input from computing device 100, e.g. an up-link channel with Bluetooth communication using module 23 of host 22. Optionally, an up-link channel is via tip 20 of stylus 120 that picks up an up-link signal transmitted via conductive strips 58 or a dedicated conductive strip that is not used for position tracking. In some exemplary embodiments, host 22 or circuit 25 instructs stylus 120 to update its transmission protocol based on analysis and reports from circuit 25 and host 22.

Figure 2:
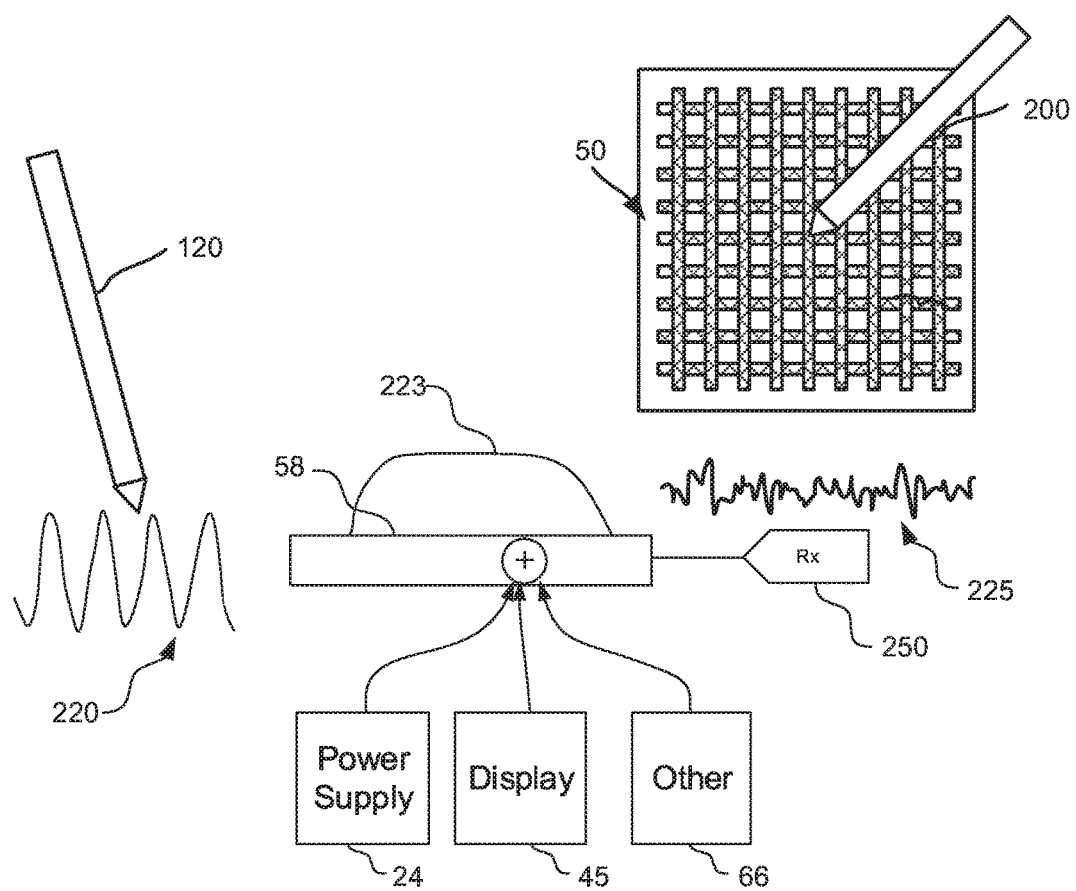
FIG. 2 is a simplified graphical representation showing sources of noise that affect detecting a stylus interacting with a digitizer sensor in accordance with some embodiments of the present disclosure.

Reference is now made to FIG. 2 showing a simplified graphical representation showing sources of noise that affect detecting a stylus interacting with a digitizer sensor in accordance with some embodiments of the present disclosure. A stylus 120 transmits a signal 220 that is received by a conductive strip 58 of a sensor 50. Optionally, conductive strip is biased with a voltage 223. Typically, during operation of a computing device, conductive strip 58 picks up signal 220 as well as noise from an operating power supply 24, electronic display 45 and other sources in the surrounding environment 66. Typically, the noise from the different sources combine with the stylus signal 220 and a signal 225 detected by a receiver 250 in circuit 25 has a low signal to noise ratio. In some exemplary embodiments, a transmission protocol is updated to mitigate noise. Noise mitigation may be implemented to improve accuracy of tip position of stylus 120 as well as to reduce data error in information transmitted by the stylus, e.g. to reduce a bit error rate (BER) or a frame error rate (FER) for a transmission frame. In some exemplary embodiments, the transmission protocol may be updated every few transmission frames or repetition cycles of the stylus or even every frame if desired based on an on-the-fly assessment of a current noise environment.

Figure 3:
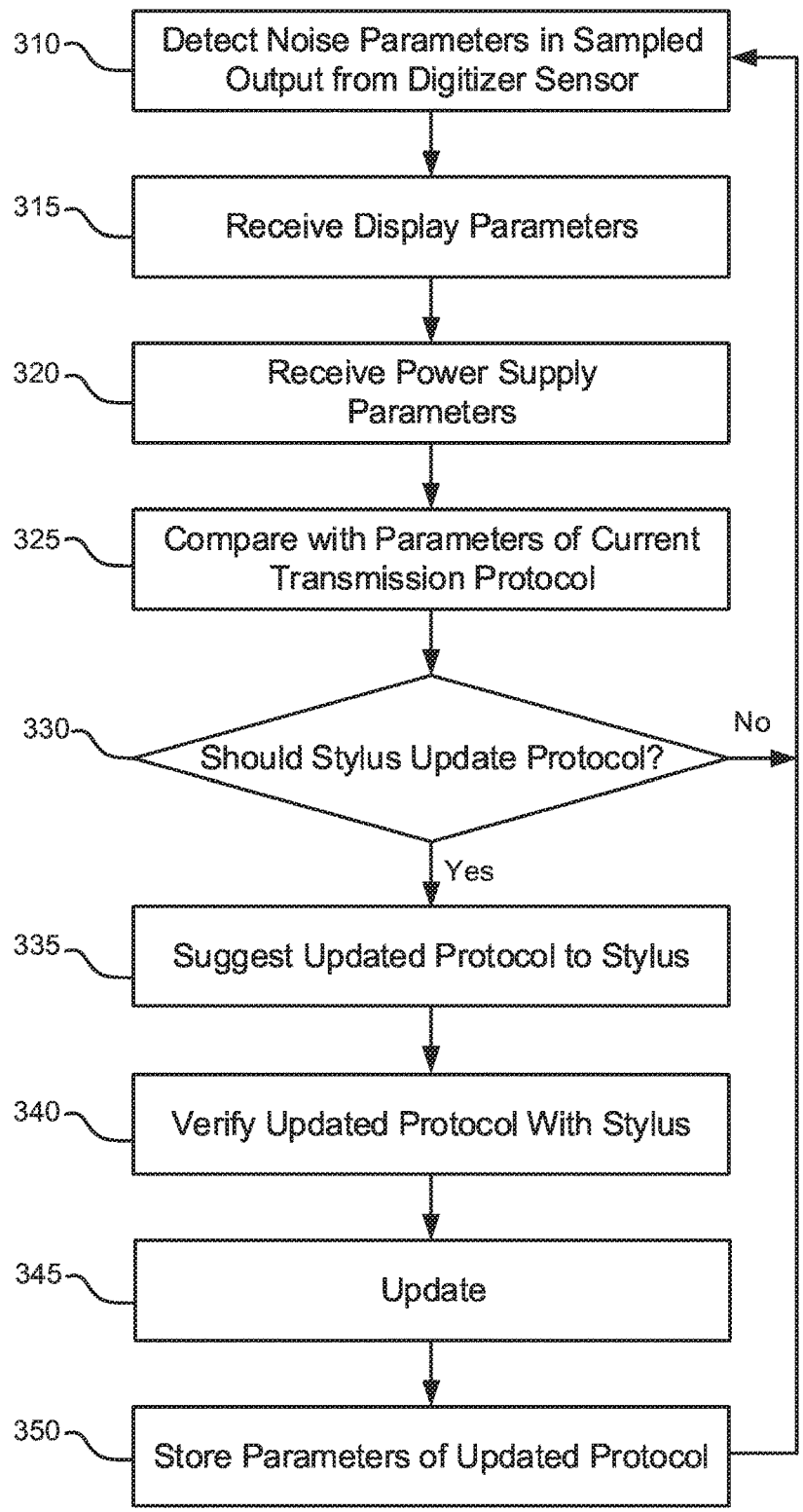
FIG. 3 is a simplified flow chart of an exemplary method to dynamically assess noise environment for a stylus and update its transmission protocol based on the assessment in accordance with some embodiments of the present disclosure.

Reference is now made to FIG. 3 showing a simplified flow chart of an exemplary method to dynamically assess noise environment for a stylus and update its transmission protocol based on the assessment in accordance with some embodiments of the present disclosure. In some exemplary embodiments, periodic sampled output from a digitizer sensor 50 is analyzed to characterize noise picked up by digitizer sensor 50. On some exemplary embodiments, output from one or more conductive strips 58 that is determined not to have received a stylus signal is used to detect noise and the noise characteristics. Optionally, conductive strips 58 that are identified as being near stylus input are used to detect noise. Location of stylus input may be determined or estimated based on the output and also based on a known previous location of the stylus. Conductive strips 58 associated with an estimated location may be identified and output from neighboring conductive strips 58 may be selected to be used to represent noise near stylus 120. In some exemplary embodiments, output from conductive strips 58 that are determined to include finger 140 or hand 142 touch input is analyzed to detect noise and the noise characteristics. One or more parameters characterizing the noise may be determined from the output sampled (block 310). One or both circuit 25 and host 22 may process output from digitizer sensor 50 to determine the characterizing parameters. Exemplary parameters include frequency and frame timing at which the noise appears.

Additional information regarding the noise is obtained from host 22. Optionally, parameters defining noise from the electronic display 45 is reported (block 315) from the GPU. Optionally, synchronization timing is reported by the GPU, e.g. Vsync and Hsync in a LCD. In addition, information regarding content of a displayed image, e.g. color is reported by a GPU. An image on a display that is mostly white imposes different noise than an image that is rich in color. Optionally, sub-pixel refresh rate is reported by the GPU and used to characterize the noise environment.

Optionally, parameters defining a current operation of the power supply are reported by CPU of host 22 (block 320). The power supply unit changes its behavior according to a current process, e.g. battery charging that is initiated based on a current battery status that is detected, idle, CPU stage and the noise obtained changes. The computing device may also change the power supply, by positioning the computing device on a cradle or plugging the device into an outlet. Noise parameters due to power may be predicated based on a current status of a battery and may be learned based on monitoring of output sampled by the digitizer system. The noise parameters detected are compared to known parameters of a current communication protocol (block 325). Based on the comparison, a discussion regarding updating the stylus transmission protocol is reached (block 330). If an improved protocol can be suggested based on the input gathered and sampled, a suggestion for updating the transmission protocol is transmitted to the stylus (block 335). The suggestion may need to be verified by the stylus (block 340) and if accepted appropriates updates are made both by the stylus circuit and the circuit 25 (block 345). Parameters of the updated transmission protocol may be stored for future reference (block 350).

Figure 4:
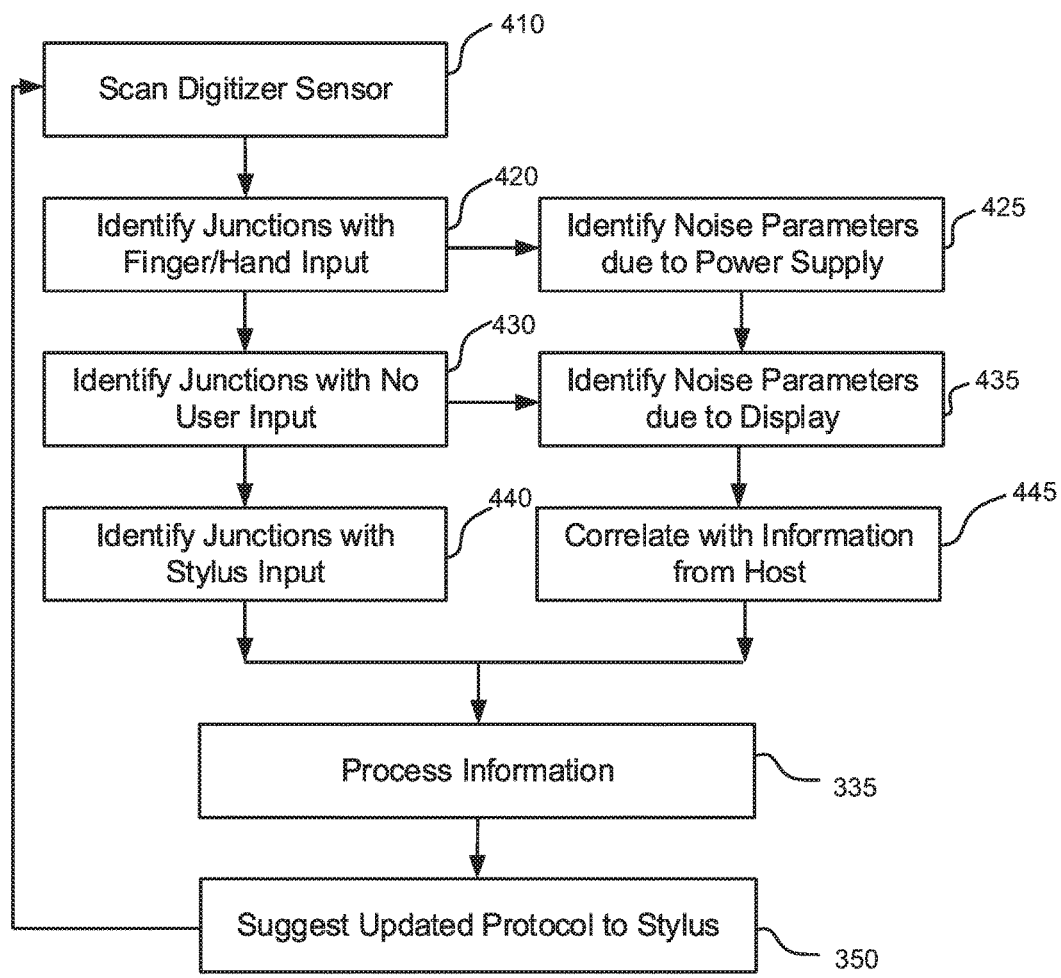
FIG. 4 is a simplified flow chart of an exemplary method to dynamically assess a noise environment based on sampled output from a digitizer sensor in accordance with some embodiments of the present disclosure.

Reference is now made to FIG. 4 showing a simplified flow chart of an exemplary method to dynamically assess a noise environment based on sampled output from a digitizer sensor in accordance with some embodiments of the present disclosure. A digitizer sensor is periodically sampled to detect interaction (block 410). Typically, mutual capacitance detection or self capacitance detection is applied to identify input by a finger or hand (block 420). In some exemplary embodiments, noise accumulated on touch input signals are analyzed to characterize activity of the power supply that lends to the noise, e.g. battery charging and switching between power supply sources (block 425). Additional noise may be characterized from output detected on lines with no interaction (block 430). Another source of noise is the electronic display, e.g. LCD. Optionally, noise derived from the electronic display is detected on lines that include no user input (block 430). Parameters characterizing the noise from the display are determined (block 435). In addition, conductive strips 58 that picked up a stylus signal are identified (block 440). In some exemplary embodiments, the power supply noise parameters determined from finger or hand touch input and the display parameters determined are further analyzed in view of reports received from the host (block 445). This information is processed (block 335) and an updated protocol is suggested that avoids the noise or increases the SNR or increase the confidence of the data received (block 350).

A transmission protocol may be updated in a plurality of manners depending on the characterization of the detected noise environment. Frequency of transmission may be updated to avoid noise frequencies, e.g. a frequency for transmission may be changed from 100 KHz to 200 KHz. A repetition cycle may be shortened to avoid LCD cyclic impulse noise, e.g. the repetition cycle may be decreased from 15 ms to 14.5 msec. Optionally, symbol size of the information transmitted may be adjusted to a current noise environment. For example, a frequency shift keying (FSK) symbol length may be increased 150 μsec to 300 μsec when a SNR is determined to be low or alternatively decreased when a SNR is determined to be high. Optionally, BER is improved by moving from binary FSK (BFSK) modulation scheme to a multiple FSK (MFSK) modulation scheme. In some exemplary embodiments, symbol timing is updated to avoid temporal noise, e.g. the symbol may be transmitted in the beginning of a frame instead of in the middle of the frame. Optionally, baud rate is modified to increase the data rate for replication or coding and decrease the data rate when the SNR ratio is high. Optionally, coding is updated to improve BER versus power and baud rate. Coding techniques such as Hamming or Golay, interleaving and scrambling can be selected as required to mitigate noise in current noise environment.

Figure 5:
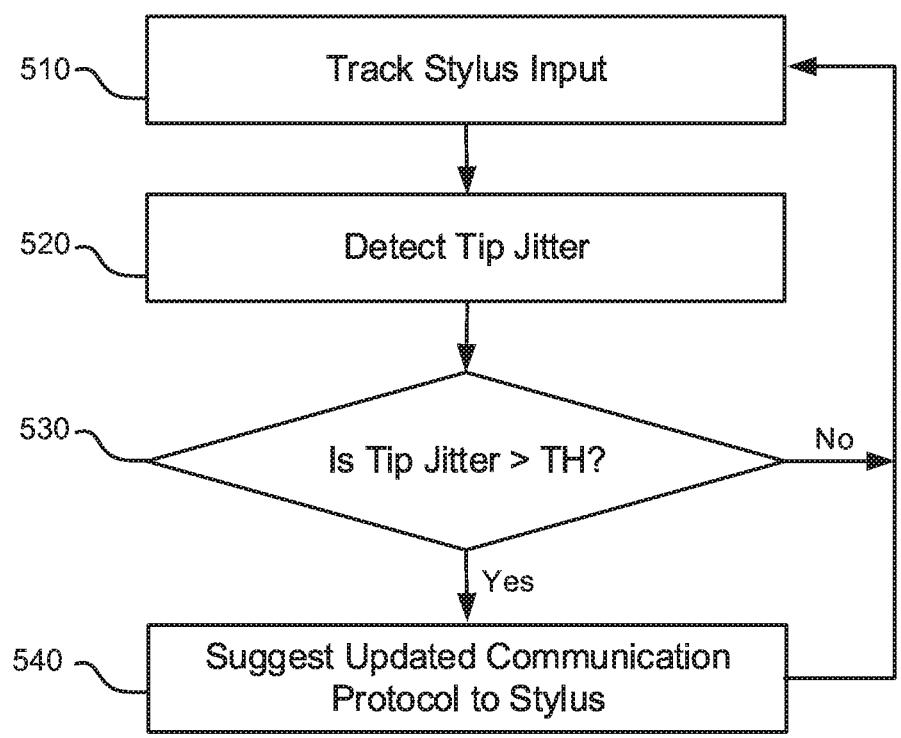
FIG. 5 is a simplified flow chart of an exemplary method to initiate updating a transmission protocol in response to detecting tip jitter in accordance with some embodiments of the present disclosure.

Reference is now made to FIG. 5 showing a simplified flow chart of an exemplary method to initiate updating a transmission protocol in response to detecting tip jitter in accordance with some embodiments of the present disclosure. Typically, tip coordinates of a stylus are tracked during user interaction with a computing device (block 510). In some exemplary embodiments, the jittering and accuracy of the tip location over time is detected (block 520). Optionally, a measure of jitter and accuracy is determined by a statistic calculation, in movement and in steady state, of the distance in time from the real position versus the measured one (optionally in units of 0.1 mm). When a measure of tip jitter is above a predefined tip jitter threshold (block 530), the digitizer system or host 22 responds by suggestion an alternate transmission protocol based on current information regarding noise (block 540). Optionally, the noise environment is monitored steadily while the digitizer receives stylus input but only requests a change in the protocol in response to detecting tip jitter. Alternatively, a request to change transmission protocol is initiated based on the noise detected as well as based on tip jitter. Optionally, tip jitter detection, prompts additional processing to remove noise that is otherwise not implemented.

According to an aspect of some embodiments there is provided a system comprising: a display integrated with a digitizer sensor; a handheld device configured to transmit a signal to the digitizer sensor based on a defined protocol; a power supply; and a controller configured to: sample output from the digitizer sensor; detect at least one parameter characterizing noise from at least one of the display and the power supply; characterize a noise environment on the digitizer sensor based on the at least one parameter detected; and provide instructions to alter a transmission protocol of the handheld device based on the noise environment.

Optionally, the controller is configured to receive synchronization timing for the display from a graphical processing unit (GPU) associated with the display and wherein the at least one parameter includes the synchronization timing.

Optionally, the controller is configured to provide instructions to alter a frame size of the handheld device transmission based on the synchronization timing of the display.

Optionally, the controller is configured to provide instructions to alter timing for a handheld device to transmit a symbol based on the synchronization timing of the display.

Optionally, the controller is configured to receive a current sub-pixel refresh rate for the display from a graphical processing unit (GPU) associated with the display and wherein the at least one parameter includes the sub-pixel refresh rate.

Optionally, the controller is configured to identify a portion of the output from the digitizer sensor that does not include user interaction and to detect noise originating from the display based on that portion of the output.

Optionally, the controller is configured to receive input from the GPU regarding content of an image on the display and the at least one parameter is associated with the input regarding the content.

Optionally, the controller is configured to identify harmonics of impulse noise based the output sampled from the digitizer sensor and the at least one parameter includes timing of the impulse noise in a refresh cycle of the digitizer sensor.

Optionally, the controller is configured to identify a portion of the output from the digitizer sensor that includes finger or hand touch input and to characterize noise originating from the power supply based on the that portion of the output.

Optionally, the controller is configured to receive information associated with activity of a power supply and to learn the noise environment associated with the information based on correlation of that information with the output from the digitizer sensor that includes finger or hand touch input.

Optionally, the controller is configured to learn the noise environment associated with an activity of the system based a correlation of reports that define the activity and based on periodic sampling of the output from the digitizer sensor.

Optionally, the controller is configured to detect jitter and/or accuracy in a detected position of the handheld device and to provide the instructions to alter the transmission protocol based on detecting jitter above a defined threshold.

According to an aspect of some embodiments, there is provided a method comprising: sampling output from a digitizer sensor integrated on a display of a computing device; detecting at least one parameter characterizing noise from at least one of the display and the power supply; characterizing a noise environment on the digitizer sensor on-the-fly based on the at least one parameter detected; and providing instructions to alter a transmission protocol of a handheld device interacting with the digitizer sensor based on the noise environment.

Optionally, the at least one parameter is synchronization timing for the display.

Optionally, the method comprising identifying a portion of the output from the digitizer sensor that does not include user interaction and detecting noise originating from the display based on the that portion of the output.

Optionally, the at least one parameter is defined based on input from the GPU regarding content of an image on the display.

Optionally, the at least one parameter is timing of harmonics of impulse noise detected on output sampled from the digitizer sensor.

Optionally, the method comprises identifying a portion of the output from the digitizer sensor that includes finger or hand touch input and characterizing noise originating from the power supply based on the that portion of the output.

Optionally, the method comprises learning the noise environment associated activity of the power supply based on correlating reported activity of the power supply with the output from the digitizer sensor that includes finger or hand touch input.

Optionally, altering the transmission protocol includes at least one of altering frequency, frame timing, symbol size, modulation, symbol timing baud rate and coding for transmission.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:
1. A system comprising:
   a display integrated with a digitizer sensor;
   a handheld device configured to transmit a signal to the digitizer sensor based on a defined protocol;
   a power supply; and
   a controller configured to:
      sample output from the digitizer sensor;
      identify an area on the digitizer sensor that does not include user interaction;
      detect noise originating from the display based on output received from the area identified, wherein said detection comprises comparing a first signal received in the identified area against a second signal received by conducting lines away from the identified area;

detect at least one parameter characterizing noise from at least one of the display and the power supply;

characterize a noise environment on the digitizer sensor based on the at least one parameter detected and the noise detected from the output received from the area identified; and provide instructions to alter a transmission protocol of the handheld device based on the noise environment.

2. The system of claim 1, wherein the controller is configured to receive synchronization timing for the display from a graphical processing unit (GPU) associated with the display and wherein the at least one parameter includes the synchronization timing.

3. The system of claim 2, wherein the controller is configured to provide instructions to alter a frame size of the handheld device transmission based on the synchronization timing of the display.

4. The system of claim 2, wherein the controller is configured to provide instructions to alter timing for a handheld device to transmit a symbol based on the synchronization timing of the display.

5. The system of claim 1, wherein the controller is configured to receive a current sub-pixel refresh rate for the display from a graphical processing unit (GPU) associated with the display and wherein the at least one parameter includes the sub-pixel refresh rate.

6. The system of claim 1, wherein the controller is configured to receive input from the GPU regarding content of an image on the display and the at least one parameter is associated with the input regarding the content.

7. The system of claim 1, wherein the controller is configured to identify harmonics of impulse noise based the output sampled from the digitizer sensor and the at least one parameter includes timing of the impulse noise in a refresh cycle of the digitizer sensor.

8. The system of claim 1, wherein the controller is configured to receive information associated with activity of a power supply and to learn the noise environment associated with the information based on correlation of that information with the output from the digitizer sensor that includes finger or hand touch input.

9. The system of claim 1, wherein the controller is configured to learn the noise environment associated with an activity of the system based a correlation of reports that define the activity and based on periodic sampling of the output from the digitizer sensor.

10. The system of claim 1, wherein the controller is configured to detect jitter and/or accuracy in a detected position of the handheld device and to provide the instructions to alter the transmission protocol based on detecting jitter above a defined threshold.

11. A method comprising:

sampling output from a digitizer sensor integrated on a display of a computing device;

identifying an area on the digitizer sensor that does not include user interaction;

detecting noise originating from the display based on output received from the area identified, wherein said detection comprises comparing a first signal received in the identified area against a second signal received by conducting lines away from the identified area;

detecting at least one parameter characterizing noise from at least one of the display and the power supply;

characterizing a noise environment on the digitizer sensor based on the at least one parameter detected and the noise detected from the output received from the area identified; and providing instructions to alter a transmission protocol of a handheld device interacting with the digitizer sensor based on the noise environment.

12. The method of claim 11, wherein the at least one parameter is synchronization timing for the display.

13. The method of claim 11, wherein the at least one parameter is defined based on input from the GPU regarding content of an image on the display.

14. The method of claim 11, wherein the at least one parameter is timing of harmonics of impulse noise detected on output sampled from the digitizer sensor.

15. The method of claim 11, comprising learning the noise environment associated activity of the power supply based on correlating reported activity of the power supply with the output from the digitizer sensor that includes finger or hand touch input.

16. The method of claim 11, wherein altering the transmission protocol includes at least one of altering frequency, frame timing, symbol size, modulation, symbol timing baud rate and coding for transmission.

17. A system comprising:

a display integrated with a digitizer sensor;

a handheld device configured to transmit a signal to the digitizer sensor based on a defined protocol;

a power supply; and a controller configured to:

sample output from the digitizer sensor;

identify an area on the digitizer sensor that includes finger or hand touch input;

identify a different area on the digitizer sensor away from the area that includes the finger or hand touch input;

determine a signal experienced at the different area on the digitizer sensor away from the area that includes the finger or hand touch input as noise;

characterize the noise as originating from the power supply based on output received from the different area; and provide instructions to alter a transmission protocol of the handheld device based on the noise originating from the power supply.

18. The system of claim 17, wherein the controller is configured to receive synchronization timing for the display from a graphical processing unit (GPU) associated with the display and wherein the at least one parameter includes the synchronization timing.

19. The system of claim 17, wherein the controller is configured to provide instructions to alter a frame size of the handheld device transmission based on the synchronization timing of the display.

20. A method comprising:

sampling output from a digitizer sensor integrated on a display of a computing device;

identifying an area on the digitizer sensor that includes finger or hand touch input;

detecting conducting lines of a different area on the digitizer sensor away from the area that includes the finger or hand touch input;

determining a signal experienced at the detected different area on the digitizer sensor away from the area that includes the finger or hand touch input as noise;

characterizing the noise as originating from the power supply based on output received from the different area; and providing instructions to alter a transmission protocol of the computing device integrated with the digitizer sensor based on the noise originating from the power supply.

* * * * *